(12) United States Patent
Kohli

(10) Patent No.: US 7,085,927 B1
(45) Date of Patent: Aug. 1, 2006

(54) SECURE DATA REPORT PREPARATION AND DELIVERY

(75) Inventor: James F. Kohli, Waukesha, WI (US)

(73) Assignee: GE Medical Systems, Inc., Pewaukee, WI (US)

( * ) Notice: Subject to any disclaimer, the term of this patent is extended or adjusted under 35 U.S.C. 154(b) by 587 days.

(21) Appl. No.: 09/620,440

(22) Filed: Jul. 20, 2000

(51) Int. Cl.
*H04L 9/00* (2006.01)

(52) U.S. Cl. ............... 713/164; 713/165; 713/166; 713/167

(58) Field of Classification Search ............... 709/229; 713/200, 164, 165, 166
See application file for complete search history.

(56) References Cited

U.S. PATENT DOCUMENTS

| | | | |
|---|---|---|---|
| 5,823,948 A * | 10/1998 | Ross et al. | 600/300 |
| 5,958,016 A * | 9/1999 | Chang et al. | 709/229 |
| 5,960,406 A * | 9/1999 | Rasansky et al. | 705/9 |
| 6,272,469 B1 * | 8/2001 | Koritzinsky et al. | 705/2 |
| 6,292,801 B1 * | 9/2001 | Campbell et al. | 707/10 |
| 6,578,002 B1 * | 6/2003 | Derzay et al. | 705/2 |
| 6,631,402 B1 * | 10/2003 | Devine et al. | 709/217 |

FOREIGN PATENT DOCUMENTS

| | | |
|---|---|---|
| WO | WO 98/59487 A | 12/1998 |
| WO | WO 99/15960 A | 4/1999 |
| WO | WO 99/42942 A | 8/1999 |
| WO | WO 00/31666 A | 6/2000 |

\* cited by examiner

*Primary Examiner*—Gilberto Barrón, Jr.
*Assistant Examiner*—G Gurshman
(74) *Attorney, Agent, or Firm*—Fletcher Yoder

(57) ABSTRACT

A technique is provided for securely storing user data and generating user reports. The user data is input manually or automatically and is transmitted to a service provider via a network. The data is stored in a secure database operating in a processing space which is not directly accessible to the user directly. Based upon pre-established report templates, user data is extracted from the secure database, and is exported from the secure processing space for use in generating user reports. The reports are formed in a second processing space, by combining the data file with the report template. The report may then be transmitted to the user automatically or may be accessed by the user via the network.

35 Claims, 3 Drawing Sheets

SECURE DATA REPORT PREPARATION AND DELIVERY

FIELD OF THE INVENTION

The present invention relates generally to the field of electronic data collection and analysis. More particularly, the invention relates to a technique for securely maintaining a base of data for analysis and reporting, and to the secure access of the information and the secure generation of reports based upon the accessed data.

BACKGROUND OF THE INVENTION

An increasing number of fields require secure collection and storage of sensitive data for reporting purposes. As data is available in an increased number of forms and through improved networking capabilities, the demands made upon secure information storage and reporting are increasingly challenging. By way of example, medical data may be collected by medical institutions, both relating to operation of the institution and to particular care or physiological conditions of a patient. The data may be required by medical professionals for analyzing the patient condition and for providing additional care. However, because the information is highly sensitive, care must be taken in its secure storage and retrieval. Similar confidentiality demands are made on data relating to utilization of equipment within institutions. In the financial arena, records of financial transactions, such as accounts, account transfers, asset and stock purchases and sales, and the like are subject to similar demands. The account manager or owner, while requiring perhaps frequent and rapid access to the information, expects the information to be stored in a highly secure manner which protects both the identity of the owner and the integrity of the data, and which generally prevents unauthorized access.

The secure storage and reporting of data is not only affected by the sensitivity of the data in individual fields of activity, but is challenged by the approaches used to access and transmit reports based upon the data. For example, medical data often must be available remotely to diagnosing physicians or institutions, being transferred by wide area networks which, while providing some measure of security, may be subject to unauthorized access. Similarly, in financial transactions, users are increasingly interested in obtaining records and reports through wide area networks and similar configurable links, while nevertheless requiring that the data be stored and accessed in a highly secure manner. This is particularly true in the increased use of the Internet for remote storage and access of data, in performing financial and other transactions, messaging, and so forth.

A range of activities are ongoing to enhance the security of data storage and access. Such techniques have typically included the use of passwords and other codes to limit access to authorized persons. Similarly, encryption technologies have been developed that can provide powerful tools in the transfer of data, requiring decryption through various means and, inherently, providing for limited access or at least deciphering of the data. While such techniques have greatly enhanced data security, further improvements are needed.

In many instances, complex data transfer techniques are not suitable for protection of data or reports. Particularly in Internet and other network applications, users may need more straightforward approaches to obtaining reports based upon their secure data. In general, it would be desirable to provide a straightforward technique which, while essentially transparent to the user, provides for a highly effective barrier between the report and its delivery file, and the underlying database repository. Moreover, where appropriate, because large or comprehensive databases may include a vast array of information, the system performance may be significantly degraded by repeated and unanticipated reporting requests. System performance could be greatly enhanced by pre-scheduled or at least periodic secure reporting, again separating somewhat the report delivery function from the report generation and data storage functions.

There is a need, therefore, for an improved technique for secure generation of reports based upon sensitive data stored in a data repository. There is a particular need for a technique which can be applied in such settings as wide area networks, particularly the Internet and its progeny, for securely accessing sensitive data and reporting the data in a manner which does not significantly affect the performance of the database or its accessing software and which provides the desired degree of separation between the database and the report generation software.

SUMMARY OF THE INVENTION

The present invention provides a technique for secure report generation designed to respond to these needs. The technique may be employed with a wide range of sensitive data including medical records, financial records, employment records, personal records, legal records, and so forth. Moreover, the technique may be used in a wide range of settings, but is particularly powerful when applied to reports generated in a relatively unsecured processing space, such as through a web agent for delivery over a wide area network, in conjunction with data stored in a more sensitive or controlled processing space. The system may be employed with existing access control techniques such as password protection, encryption, and so forth, providing an additional layer of security for the data and reports.

In accordance with aspects of the present technique, underlying data used for generation of the reports is stored in a processing space which is secure and which is generally not accessible to a class of users, including the party to whom a report is destined. A report template or similar software device defines data which is required for generation of the report. A data file is thus generated in the processing space and is stored and exported to the first of processing space for generation of the report. The report template may then be completed in the first processing space, and formatted in any of a variety of manners, such as in an HTML page. The report may then be delivered, such as through wide area networks, virtual private networks, or any other suitable manner without providing access by the user to the more controlled processing space.

DETAILED DESCRIPTION OF THE INVENTION

Figure 1:
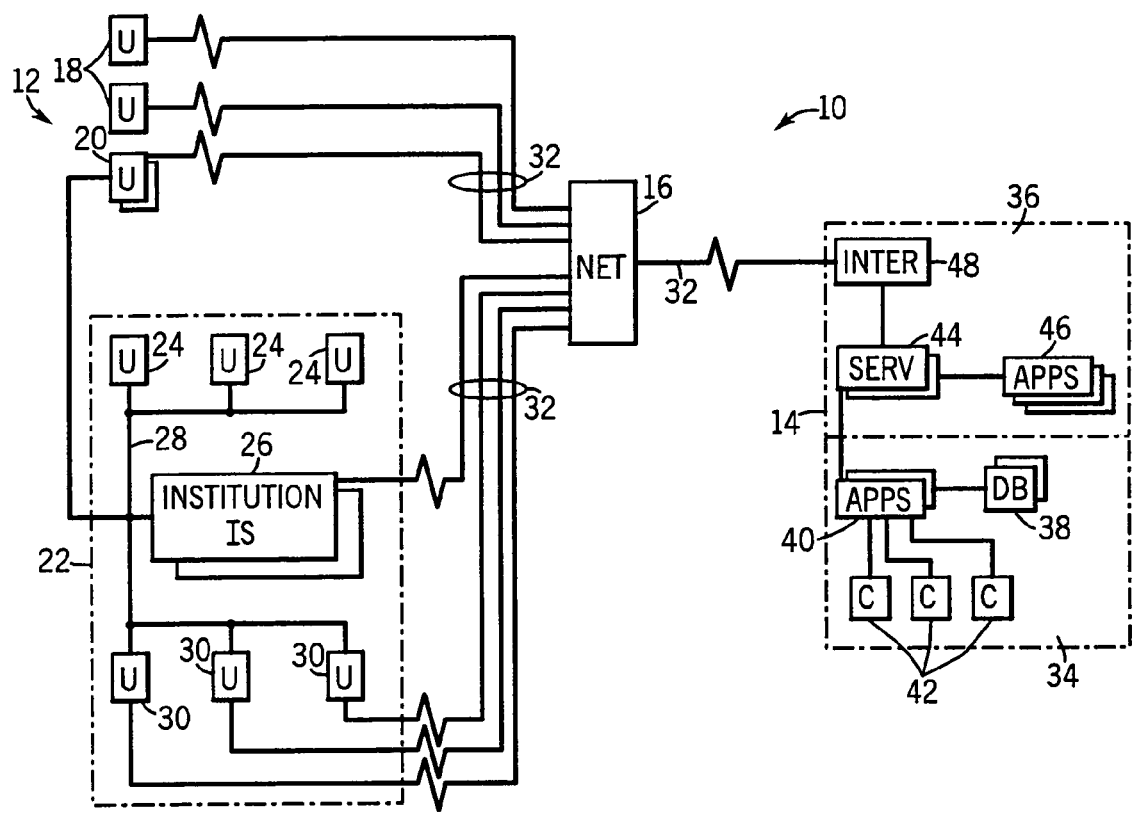
FIG. 1 is a diagrammatical representation of a data collection and reporting system incorporating aspects of the present technique.

Turning to the drawings, and referring first to FIG. 1, a data collection and reporting system 10 is illustrated diagrammatically and is adapted for receiving user data, processing and storing the user data, and generating reports based upon the user data. The system may be employed in a wide range of settings in which the secure storage and reporting of user-related data, or data derived from collected data is of interest. By way of example, data collected and reported in system 10 may include medical data, financial data, personal records, business records, confidential documents, legal or judicial records, and so forth. In general, the system is particularly well suited to applications in which a user or users input data and expect the data to be handled confidentially, with a need to obtain output or reports of the same or related data on a periodic or on-demand basis. As described below, such reports may be generated upon request of a user, or in accordance with pre-established schedules. Moreover, the system is particularly well suited to applications in which user data is transmitted over a configurable network, such as the Internet. Thus, although the data is stored and reports are generated in such a way as to protect the repository on which the data is stored, actual data and reports may be transmitted through a somewhat less secure medium. Furthermore, system 10 is well suited to applications in which a secure database is accessed only by a limited user population or specific software applications, thereby substantially enhancing the security of the database, and reducing the number of individual queries to the database, and enhancing a system performance.

As illustrated in FIG. 1, system 10 includes a variety of data sources, designated generally by the reference numeral 12, which are in contact with a service provider 14 via a network 16, such as the Internet. It should be noted, however, that other networks may be employed in the present technique, including internal networks, dedicated networks, virtual private networks, and so forth. Among the sources of data, individual users 18 may directly contact or be contacted by the service provider 14. Moreover, consulting users 20, which may be permanently or intermittently linked to institutions 22, may also provide sources of data as described below. Such consultants may include financial consultants, technicians, service engineers, and so forth.

Where institutions 22 are included in the system, these may include, internally, a variety of users and user systems which may also serve as sources of data. For example, individual users 24 may be linked to an institution information system 26, such as via an intranet 28, such as an ethernet topography. Similarly, additional users 30 may be present in the institution, also linked to the institution information system. The users within the institution may form different classes or groups, such as wherein the users 24 must access remote information sources, such as service provider 14, through the institution information system or other data transfer circuits. Other users 30 may be provided with individual, dedicated, or other special communications circuitry and interface software for directly accessing remote information sources.

Users 18, 20, 24 and 30, as well as institution information services 26, may be linked to the network 16 via any suitable circuitry. By way of example, the users may interface with the Internet via conventional modems, cable modems, wireless modems, modem banks, servers, or any other communications devices. Moreover, while network links 32 are illustrated for each of the users, these may, in practice, constitute any suitable medium, employing various communications protocols, such as TCP/IP. Service provider 14 is also linked to network 16 via a network link 32, which is compatible with the network and network links employed by the users.

Service provider 14 will generally be used by or contracted by the users for storage and retrieval of data and reports. Thus, the service provider may constitute a data provider only, or may offer additional services to the users, such as financial services, medical services, technical services, and so forth. To securely store and process data from the users, the service provider 14 includes processing capabilities divided into a first, secure processing space 34, and a second processing space 36, which may generally be accessed by users for inputting data and receiving reports.

Within secure processing space 34, service provider 14 includes one or more databases 38 which are generally not accessible by the users. It should be noted that database 38 may include a range of related or inter-related databases and may be stored on one or more memory devices at one or more locations, particularly for larger information databases, and for redundancy and backup. A set of applications 40 run within a secure processing space 34, such as to load information into database 34, access data from the database, and so forth. It should be noted that any suitable hardware configuration may be employed for running applications 40, including personal computers, workstations, mainframe computers, and so forth. Where desired, service provider 14 may include a series of client stations 42 linked via applications 40 to the database, and to the users, so as to permit servicing of the database and applications, and to coordinate data flow within the service provider information system.

Within the second processing space 36, service provider 14 includes one or more servers 44 which store and direct data between users and the secure processing space 34. A series of applications 46 are available to servers 44, such as for report formatting and delivery, and for receiving user data, as described below. Interface circuitry 48 is provided for transmitting and receiving data via a network 16.

It should be noted that, where appropriate, service provider 14 may include additional circuitry and systems for processing data, and for communicating with users. By way of example, a medical institution or medical service facility may include a wide range of analytical tools adapted to process and analyze the user data to evaluate status of equipment, financial performance of an institution, and so forth. Similarly, a financial service provider may include records relating to accounts, user histories, and the like. Moreover, service provider 14 may include additional functional components for transmitting and receiving information to and from users, such as through websites, specialized applications and software, and the like.

Figure 2:
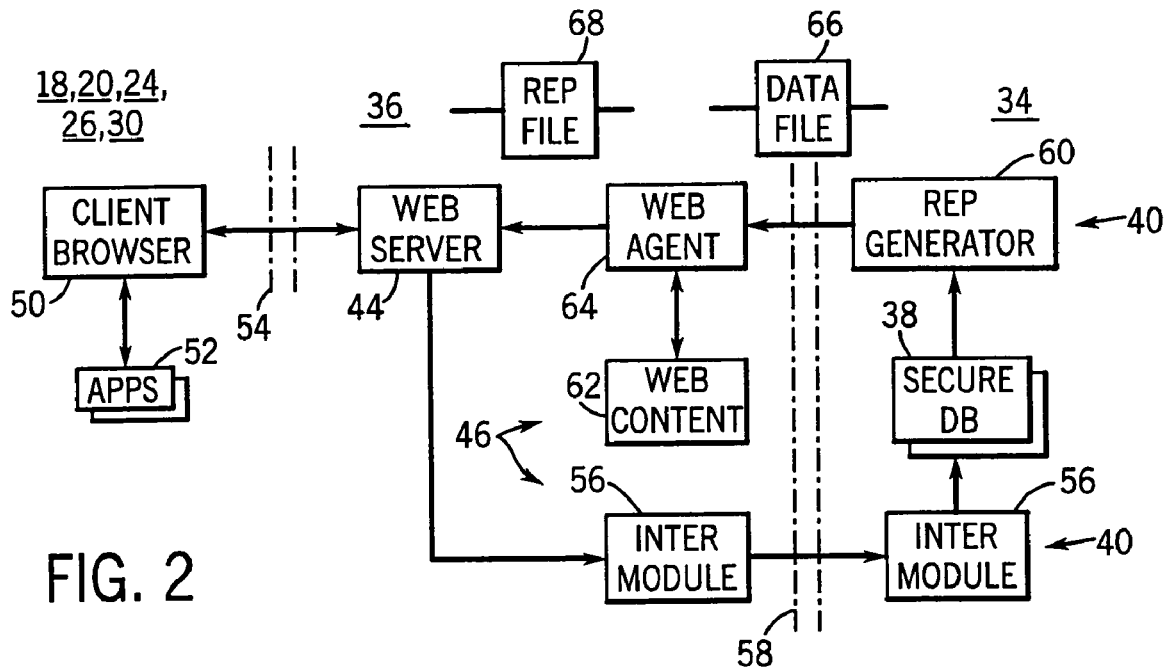
FIG. 2 is a diagrammatical representation of functional components of the system of FIG. 1 designed to collect, securely store, and securely report user data.

FIG. 2 illustrates certain of the functional components of the system of FIG. 1, specifically adapted for transmitting and receiving data, storing the data securely, and reporting on the data in a secure manner. As illustrated in FIG. 2, the system is particularly well suited for interfacing with users 18, 20, 24, 26 and 30 via conventional network applications such as a client browser 50. Where desired, any other network interface application may be employed, and the browser 50 may operate on any suitable computer system, such as a conventional personal computer or workstation. Additional applications 52 compliment browser 50, such as for storing user information or performing calculations based upon the user data. The browser 50, and any necessary network interface applications, communicate with a server, such as a web server 44 of the service provider through the intermediary of at lease one isolation and protection device 54, such as a firewall. The web server 44, which is adapted to run software applications for interfacing with the client browser, is complimented by the hardware and software 46 running within the process space 36 of the service provider. In particular, an interface module 56 cooperates with the web server to receive and input data from the users to the secure processing space 34. Interface module 56 thus cooperates with a similar interface module 56 operative within the secure processing space 34 through the intermediary of an additional isolation and protection device 58, such as an internal firewall within the service provider information system. Interface module 56, and firewall 58 serve to transmit user data to the secure database 38, and isolate the database from direct access by the users. Within the secure processing space 34, the service provider includes a report generator module 60 which is designed to extract desired data from the secure database 38 for generating user reports.

Within processing space 36 of the service provider, one or more applications and files are stored for producing, formatting, storing and transmitting user reports based upon the data extracted by the report generator module 60. In the embodiment illustrated in FIG. 2, web content 62 is stored within processing space 36 and includes instructions for formatting reports distributable over the network. The web content 62 is accessed by an application, such as a web agent 64, to produce reports based upon predefined report templates. In general, the report template will define specific data which is needed from the secure database 38 for producing a user report. As described below, with the report template predefined, and stored within the second processing space 36, report generator 60 is adapted to extract the needed data from the secure database 38, and produce a data file 66. The data file 66, which is preferably specific to the user and to the report, may include raw data from the secure database, as well as processed data, such as data combined with, compared to, or otherwise analyzed with data from the secure database or from other sources, to produce the data file. Data file 66 is then exported from the secure processing space 34, through firewall 58, to the second processing space 36.

Web agent 64 in conjunction with any web content 62 stored within processing space 36, formats a user report to generate a report file 68 based upon the data file and upon the web content. As noted above, the web content will generally include a report template and instructions for formatting the report. In a presently preferred configuration, the web agent formats the report file 68 to produce a user-viewable report in the form of a series of HTML pages. Where appropriate, other markup languages and report formats may be employed. Report file 68 is stored within processing space 36, from which it is distributed to the user via web server 44.

Figure 3:
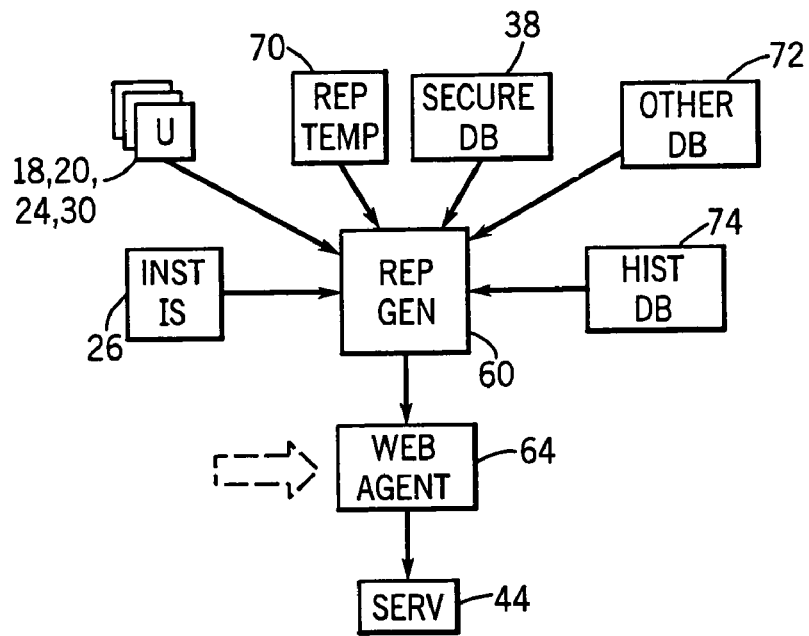
FIG. 3 is a data flow diagram illustrating the sources of data used in the secure report generation implemented through the system of FIG. 2.

The various inputs considered for the creation of the reports produced by the report generator 60, in conjunction with the web agent 64 and server 44 may include, by way of example, those illustrated as in FIG. 3. In general, the reports may include both user data from the secure database 38, as well as data forming the report template, as indicated by reference numeral 70 in FIG. 3. Again, the report template file is stored in processing space 36 and is employed in defining the data file produced by the report generator 60, and in compiling the report based upon the data file for transmission to the user. Moreover, the report generator draws upon sources of data, including the users themselves as noted in FIG. 3. Again, because the secure processing space 34 is generally not accessible directly by the user, such user input will typically be channeled through interface modules 56 as illustrated in FIG. 2. Other sources of data for the reports include institutional information systems 26, which may generate data derived from particular user inputs. Further databases may also serve as the basis for reports. As illustrated in FIG. 3, other databases 72 may include publicly available databases, subscription databases, specialty databases held or compiled by the service provider, and so forth. By way of example, where benchmarking or comparison information is included in the reports, the database serving as a basis for such comparisons may be compiled by the service provider, such as based upon a known population of users comparable to the user for which the report is being generated. Historical databases 74 may also be employed for the report generation. Such historical databases may include historical information relating to the user, such as transaction information, services performed for the user, user purchases, user inventories, user accounts, and so forth.

Based upon these inputs, the report generator 60 creates the data file as described above and exports the data file to the web agent 64. The arrow illustrated in broken lines in FIG. 3 indicates that certain of the sources drawn upon by the report generator may also be employed by web agent 64. Thus, certain of the data used to generate the final report may be stored in or accessible from the second processing space 36. Once the report file has been generated by the web agent 64 and stored in the processing space 36, server 44 aids in distributing the report as described below.

Figure 4:
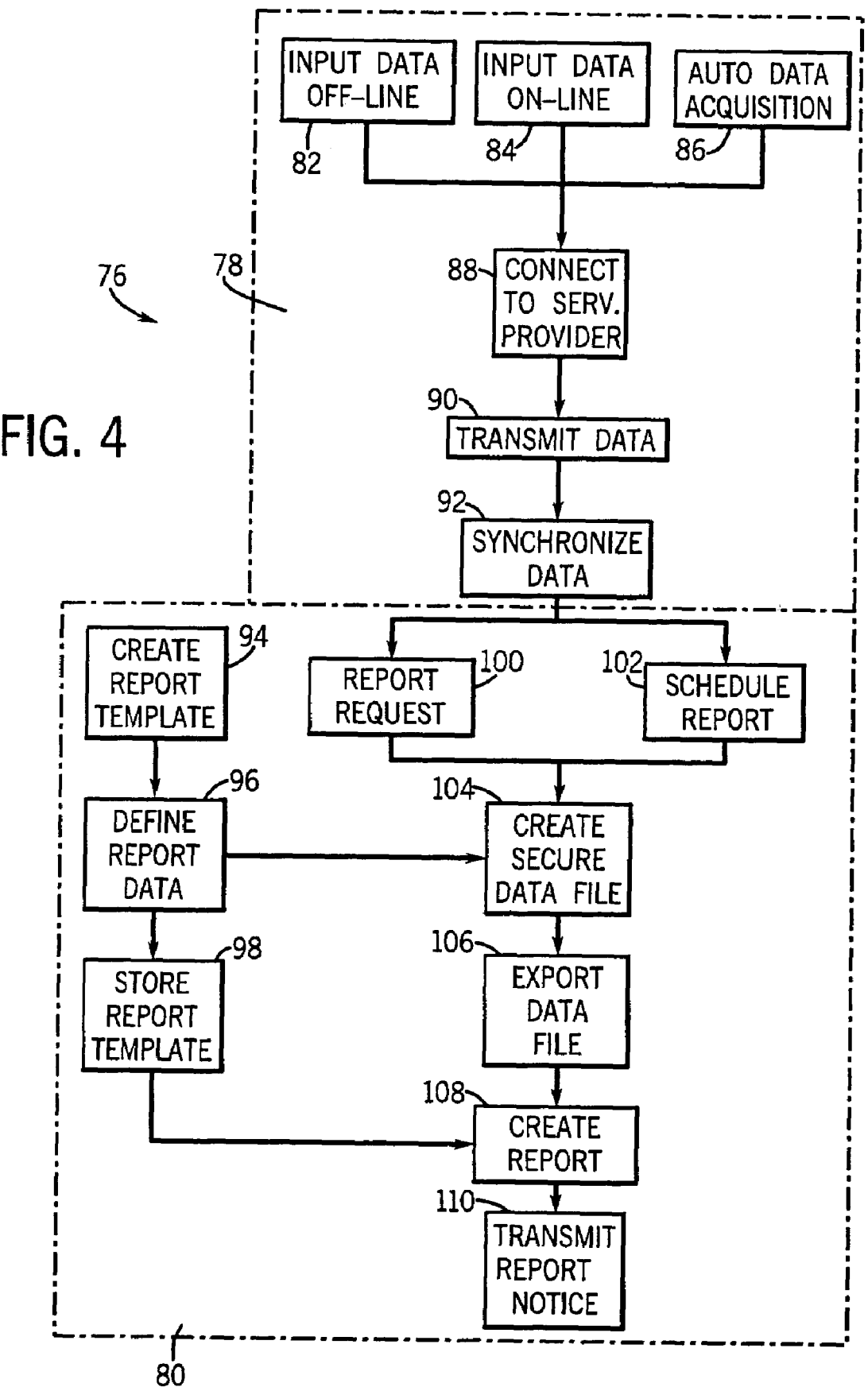
FIG. 4 is a block diagram illustrating exemplary control logic in collecting, securely storing and reporting data in accordance with aspects of the present technique.

FIG. 4 illustrates exemplary steps in control logic for storing user data and for generating the reports securely and with minimum intervention into the functioning of the secure database. The exemplary control logic of FIG. 4 may be divided into a data collection sequence 78 and a reporting sequence 80. The data collection sequence 78 begins with input of user data. The input may include any suitable sequence of steps, and in general, may include off-line data input, as indicated at reference numeral 82. Such off-line input may occur as services are provided to a user, or as the user carries out functions or requests services or transactions from the service provider. The input of data may also occur on-line as indicated at reference numeral 84, such as during the provision of services. Moreover, the input of data may include automatic data acquisition sequences, such as sequences in which the service provider server accesses and downloads information automatically from user stations, subscribing equipment, and so forth.

Following the initial data input, a connection is established between the user and the service provider as indicated at step 88. As noted above, the network connection between the user and the service provider may be indirect, such as for users coupled to an institution network. At step 90 the data is transmitted from the user to the service provider, and step 92 the data is synchronized with data in the database. The synchronization operation carried out at step 92 is designed to ensure that the most up-to-date user data is stored in the secure database. Where desired, the data input, including the original data input and/or the synchronization of data with the secure database, may be limited to specific users or stations, with password protection, encryption, or any other suitable technique being used to limit or restrict input of data and to maintain the integrity of user data in the secure database.

Once the user data has been stored in the secure database, reports may be generated as indicated by the reporting sequence 80. In general, such reports are preferably created in accordance with a template which is created at step 94. As noted above, the template is preferably stored in the second processing space 36 maintained by the service provider. The data required to complete or populate the report is thus defined at step 96 based upon the report template. It should be noted that a wide variety of reports may be created at step 94, with corresponding data being defined at step 96. The reports may include user or transaction-specific reports, as well as a series of "virtual reports" consisting, for example, as user-viewable pages to which the user may navigate in a conventional web browser. At step 98 the report template is stored for use in compiling and formatting the report. Reports may be generated upon request by users, as indicated at step 100 in FIG. 4, or in accordance with a regular schedule, as indicated at step 102. In a present embodiment, scheduled reporting is preferred where utilization of the database (e.g., the number of times the database is accessed to extract user data) may slow or otherwise inhibit the system performance. Depending upon the user data, and upon the reporting cycle, such reports may be regularly scheduled to be produced monthly, weekly, daily, or otherwise.

Once a report has been initiated either by request or by a regular schedule, the secure data file discussed above is created at step 104. Again, the data file is created by extraction of user data from the secure database in accordance with the data defined by the report template. At step 106 the data file is exported from the secure processing space 34 to processing space 36. Within processing space 36, the data file is combined with the report template to create the report as indicated at step 108. The finished report is then transmitted to the user, as indicated at step 110. It should be noted that, where desired, the report may be stored after creation and may be maintained for a predetermined time period, to allow the user to gain access to, transmit, review, and otherwise manipulate the report remotely. In such cases, a notice alone may be transmitted to the user at step 110 during a first instance, with the user accessing the report at a later convenient time via the service provider server and network connection.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A method for securely generating reports for transmission over a configurable network, the method comprising the steps of:
   storing data generated by a user on a secure data repository and operative in a first processing space inaccessible to the user;
   accessing data from the repository to create a secure data file in the first processing space;
   providing the secure data file to a second processing space separated from the first processing space by a security device; and
   generating the report in the second processing space based upon the secure data file for transmission to the user via the configurable network.

2. The method of claim 1, further comprising generating a report template defining report data for presentation in the report, the secure data file being generated based upon the report data.

3. The method of claim 2, further comprising storing the report template in the second processing space.

4. The method of claim 3, wherein the report is generated in the second processing space based upon the report template and the secure data file.

5. The method of claim 1, further comprising formatting the report in the second processing space for transmission to the user via the configurable network.

6. The method of claim 5, wherein the report is formatted as at least one user viewable page in a markup language.

7. The method of claim 5, wherein the configurable network includes the Internet.

8. The method of claim 1, wherein the second processing space is separated from the configurable network by a second security device.

9. The method of claim 1, wherein the data is accessed in accordance with a predetermined reporting schedule.

10. The method of claim 1, wherein the data is accessed in response to a user prompt for report generation.

11. The method of claim 1, wherein the security device includes a firewall.

12. The method of claim 1, further comprising automatically generating a notification message indicative of availability of the report, and transmitting the notification message to the user via the configurable network.

13. The method of claim 12, wherein the report is maintained in the second processing space at least until the user accesses the report via the configurable network.

14. A method for securely generating reports of data associated with a user, the method comprising the steps of:
   storing user data generated by the user in a first data repository;
   transmitting at least a portion of the user data from the first data repository to a second data repository operative in a first processing space inaccessible to the user;
   defining a report template, the report template identifying data for presentation in a report;
   generating a secure data file in the first processing space comprising data identified in the report template;
   exporting the secure data file to a second processing space separated from the first processing space and accessible to the user; and
   generating the report in the second processing space based upon the template and the data file.

15. The method of claim 14, wherein the user data is stored in the first data repository and is synchronized with data stored in the second data repository.

16. The method of claim 14, wherein the first processing space is separated from the second processing space by a firewall.

17. The method of claim 14, wherein the user data is transmitted from the first data repository to the second data repository during an automated data collection sequence.

18. The method of claim 14, wherein the secure data file is generated in accordance with a predetermined report generation schedule.

19. The method of claim 14, wherein the report is stored in the second processing space at least until accessed by the user.

20. A system for generating reports of user data, the system comprising:
   a secure data repository operative in a first processing space for storing user-generated data input via a configurable network, the first processing space being inaccessible by the user via the network;

a data access program module, operative in the first processing space for extracting report data from the secure data repository;

a second data repository operative in a second processing space securely separated from the first processing space for storing the report data extracted by the data access program module;

a report template stored in the second processing space; and a report generation program module, operative in the second processing space for generating a report based upon the report data and the report template.

21. The system of claim 20, wherein the data access program module is configured to extract the desired data in accordance with a predetermined schedule.

22. The system of claim 20, wherein the second data repository is configured to store the report.

23. The system of claim 20, wherein the second data repository is accessible by the user via the network.

24. The system of claim 20, comprising a server coupled to the second data repository for transmitting the report to the user.

25. The system of claim 24, wherein the server is configured to be coupled to a wide area network, and to transmit the report to the medical diagnostic facility via the wide area network.

26. The system of claim 20, wherein the first and second processing spaces are separated by a firewall.

27. A system for securely generating reports for transmission over a configurable network, the system comprising:

means for storing data generated by a user on a secure data repository and operative in a first processing space inaccessible to the user;

means for accessing data from the repository to create a secure data file in the first processing space;

means for providing the secure data file to a second processing space separated from the first processing space by a security device; and means for generating the report in the second processing space based upon the secure data file for transmission to the user via the configurable network.

28. A method for securely generating reports of data associated with a user, the method comprising the steps of:

storing user data generated by the user in a first data repository;

transmitting at least a portion of the user data from the first data repository to a second data repository operative in a controlled access processing space inaccessible to an intended recipient of a report;

generating a secure data file in the controlled access processing space comprising data derived form the user data;

exporting the secure data file to a second processing space separated from the controlled access processing space to generate a report based upon the secure data file; and permitting access to the report from the second processing space by the intended recipient of the report.

29. The method of claim 28, wherein the controlled access processing space is separated from the second processing space by a firewall.

30. The method of claim 28, wherein the user data is transmitted from the controlled access processing space to the second processing space during an automated data collection sequence.

31. The method of claim 28, wherein the secure data file is generated in accordance with a predetermined report generation schedule.

32. The method of claim 28, wherein the report is stored in the second processing space at least until accessed by the intended recipient of the report.

33. A system for generating reports of user data, the system comprising:

a secure data repository operative in a first processing space for storing user-generated data input via a configurable network, the first processing space being inaccessible by an intended recipient of a report;

a data access program module, operative in the first processing space for extracting report data from the secure data repository;

a second data repository operative in a second processing space securely separated from the first processing space for storing the report data extracted by the data access program module;

a report template stored in the second processing space; and a report generation program module, operative in the second processing space for generating a report based upon the report data and the report template, the report generation program module providing access to the report by the intended recipient of the report.

34. The system of claim 33, wherein the data access program module is configured to extract the desired data in accordance with a predetermined schedule.

35. The system of claim 33, wherein the second data repository is configured to store the report.

* * * * *